United States Patent
Pranav et al.

(10) Patent No.: US 10,288,405 B2
(45) Date of Patent: May 14, 2019

(54) ALIGNMENT GAUGE AND METHOD OF USE

(71) Applicant: WHIRLPOOL CORPORATION, Benton Harbor, MI (US)

(72) Inventors: Pranav, St. Joseph, MI (US); Manjur Tamboli, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 190 days.

(21) Appl. No.: 15/388,373

(22) Filed: Dec. 22, 2016

(65) Prior Publication Data
US 2018/0180398 A1    Jun. 28, 2018

(51) Int. Cl.
| | | |
|---|---|---|
| *G01B 5/25* | (2006.01) | |
| *G01B 3/30* | (2006.01) | |
| *F25D 23/02* | (2006.01) | |

(52) U.S. Cl.
CPC ............... *G01B 5/25* (2013.01); *F25D 23/02* (2013.01); *G01B 3/30* (2013.01); *F25D 2323/021* (2013.01)

(58) Field of Classification Search
CPC ... G01B 5/25; G01B 3/30; G01B 3/32; G01B 3/46; G01B 3/50
USPC ............. 33/533, 613, 645, 501.45, 545, 194
See application file for complete search history.

(56) References Cited

U.S. PATENT DOCUMENTS

| | | | |
|---|---|---|---|
| 3,785,685 A | | 1/1974 | MacDonald et al. |
| 3,888,477 A | * | 6/1975 | Tate .......................... E04F 21/26 249/14 |
| 3,972,550 A | | 8/1976 | Boughton et al. |
| 4,317,516 A | | 3/1982 | Palmer-Ball, Sr. |
| 4,930,225 A | * | 6/1990 | Phillips ..................... B25H 7/00 33/526 |
| 5,933,975 A | * | 8/1999 | Pate ........................ G01B 5/25 33/533 |
| 7,065,832 B2 | | 6/2006 | Pohl |
| 9,433,292 B2 | | 9/2016 | Dubina et al. |
| 2002/0083610 A1 | * | 7/2002 | Camara ..................... E04B 5/12 33/645 |
| 2002/0121027 A1 | * | 9/2002 | Kruskamp .......... E04F 21/0092 33/526 |
| 2008/0010846 A1 | * | 1/2008 | Bingham ............ E04F 21/0092 33/613 |
| 2010/0095597 A1 | | 4/2010 | Zounis, Jr. |
| 2011/0219724 A1 | * | 9/2011 | Davis .................. E04G 21/1891 52/745.09 |
| 2015/0096185 A1 | * | 4/2015 | Doyle .................... E04F 21/003 33/645 |
| 2016/0076869 A1 | * | 3/2016 | Mermoud ................ G01B 3/14 33/194 |
| 2016/0290709 A1 | | 10/2016 | Kobos et al. |

\* cited by examiner

*Primary Examiner* — Christopher W Fulton
(74) *Attorney, Agent, or Firm* — Price Heneveld LLP (57) ABSTRACT

An alignment gauge includes a generally u-shaped main body and an alignment member extending therefrom. The alignment gauge is configured to be positioned on the frame of a cabinet during installation of one or more attached components, such as attachment of a pair of doors to a refrigerator cabinet. Specifically, the alignment gauge may be positioned so that the alignment member establishes a proper spacing for the attached components.

17 Claims, 7 Drawing Sheets

ALIGNMENT GAUGE AND METHOD OF USE

BACKGROUND OF THE DISCLOSURE

The present disclosure generally relates to an alignment device and a method for use in assembling components of an appliance.

SUMMARY OF THE INVENTION

One aspect provides an alignment gauge for a refrigerator comprising a main body having a first downward extending portion and a second downward extending portion. The main body is configured to be positioned on a cabinet of the refrigerator. The alignment gauge further comprises an alignment member extending outwardly from the first downward extending portion, wherein a dimension of the alignment member is the same as a spacing between a pair of doors associated with the refrigerator.

Another aspect provides an alignment gauge comprising a u-shaped main body that is configured to be positioned on a cabinet. The alignment gauge also comprises an alignment member extending outwardly from the main body, wherein the alignment member is configured to establish a spacing for at least one component attached to the cabinet.

Yet another aspect provides a method of aligning a door on a refrigerator cabinet. The method comprises positioning an alignment gauge on the refrigerator cabinet and then positioning the door on the refrigerator cabinet so that a surface of the door abuts a surface of the alignment gauge. Finally, the method comprises coupling the door to the refrigerator cabinet.

These and other features, advantages, and objects of the present disclosure will be further understood and appreciated by those skilled in the art by reference to the following specification, claims, and appended drawings.

BRIEF DESCRIPTION OF THE DRAWINGS

Further advantages and features according to the present disclosure will become clear from the following detailed description provided as a non-limiting example, with reference to the attached drawings in which.

DETAILED DESCRIPTION

The present illustrated embodiments reside primarily in combinations of apparatus components and method steps related to an alignment gauge. Accordingly, the apparatus components and method steps have been represented, where appropriate, by conventional symbols in the drawings, showing only those specific details that are pertinent to understanding the embodiments of the present disclosure. Further, like numerals in the description and drawings represent like elements.

Figure 1:
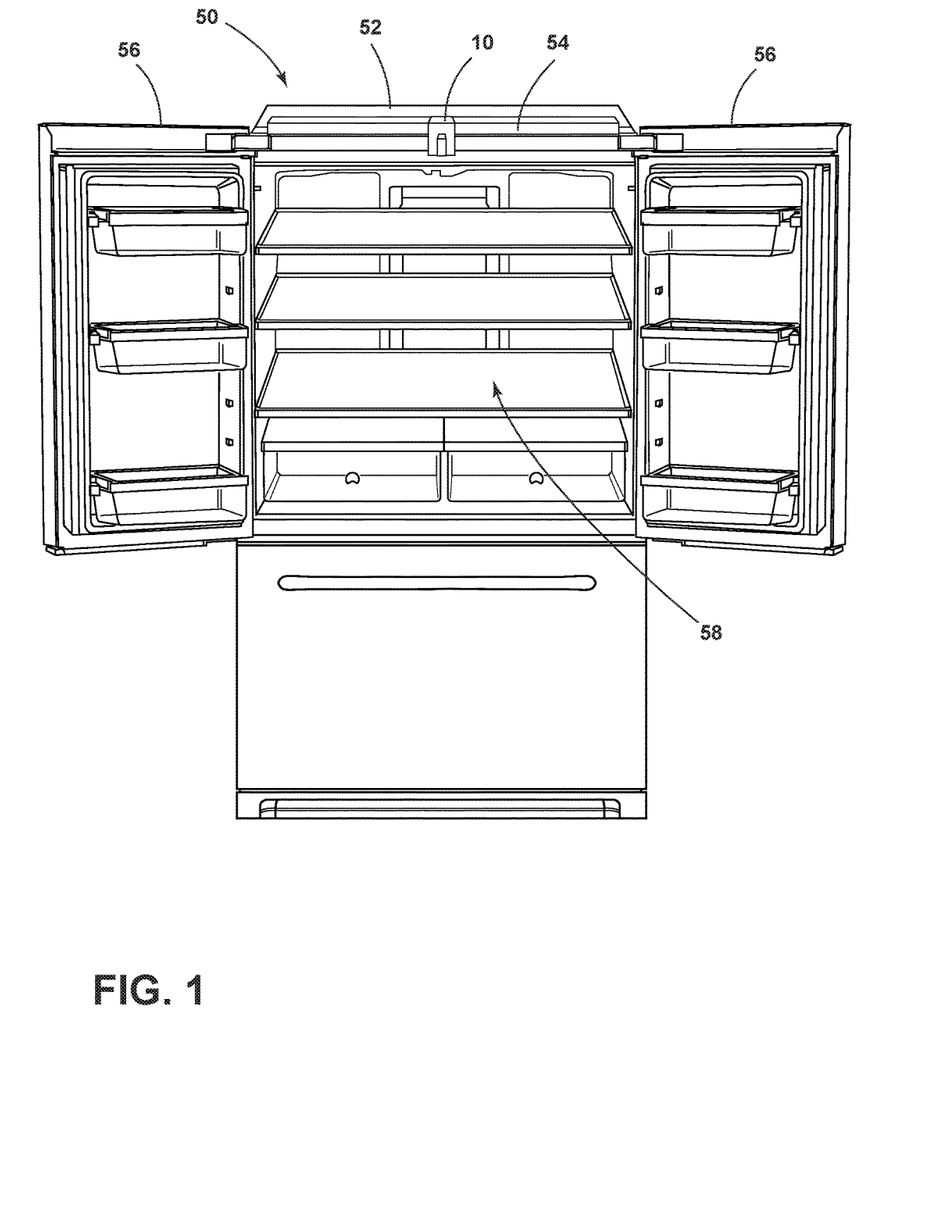
FIG. 1 is a front elevation view of an alignment gauge positioned on a refrigerator, according to an embodiment of the present disclosure.
Figure 2:
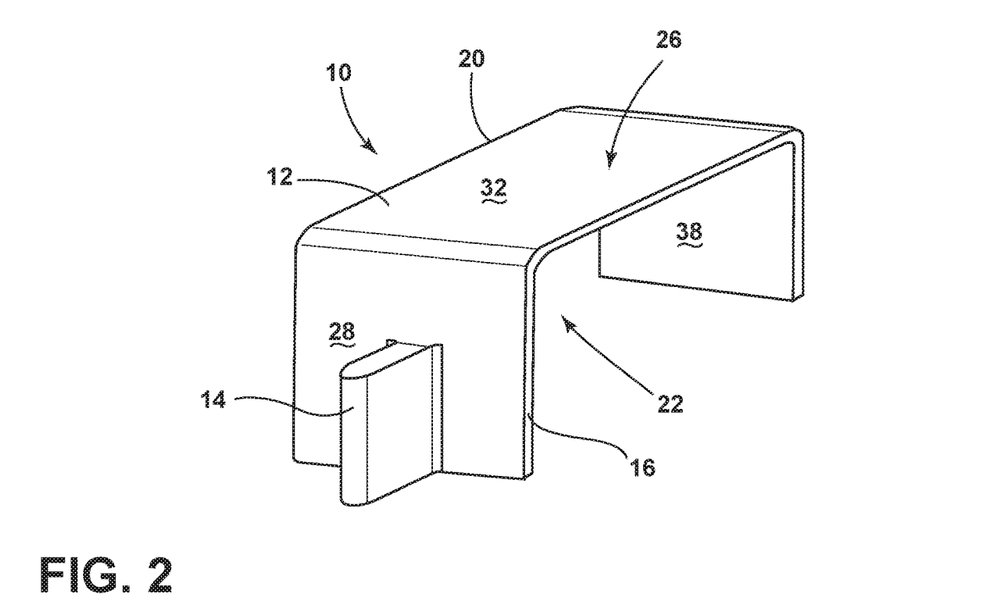
FIG. 2 is a top perspective view of the alignment gauge according to an embodiment of the present disclosure.
Figure 3:
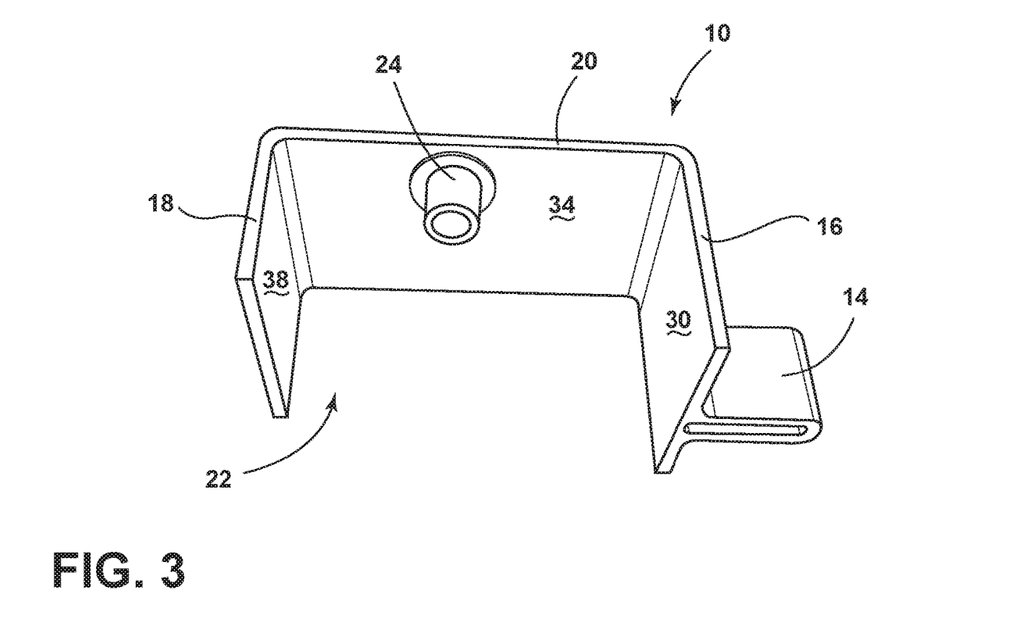
FIG. 3 is a bottom perspective view of the alignment gauge of the embodiment according to the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. For example, an element proceeded by "comprises a . . . " does not, without more constraints, preclude the existence of additional identical elements in the process, method, article, or apparatus that comprises the element.

For purposes of this disclosure, the term "coupled" (in all of its forms, couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated.

The present disclosure provides an alignment gauge for use in aligning one or more components, such as a cabinet door, on a cabinet. For example, the alignment gauge described herein may be used to position one or more doors on a cabinet during installation or re-installation of the doors to establish the proper door alignment and spacing with respect to each other and the frame of the cabinet. In some cases, an alignment gauge as described herein may be used to establish spacing and alignment of various components associated with the cabinet, such as doors, drawers, or the like, for a utility cabinet such as a kitchen cabinet or other utility-type cabinet. In other cases, an alignment gauge may be used to establish spacing and alignment for one or more doors associated with an appliance, such as a refrigerator. In at least one case, an alignment gauge 10 may be used to establish spacing and alignment for a pair of doors on a French-door style refrigerator, such as refrigerator 50 shown in FIGS. 1 and 6-8.

FIG. 1 depicts an exemplary refrigerator 50 on which an embodiment of an alignment gauge as described herein, e.g. alignment gauge 10, may be used. Refrigerator 50 includes an outer frame or cabinet 52 that incorporates one or more cavities 58 for cooling food items and a pair of doors 56, as would be known in the art. Refrigerator 50 may also include an eyebrow assembly 54 for incorporation of various electrical components associated with refrigerator 50. Refrigerator 50 is shown by way of illustration only, and it should be understood that the alignment gauge and associated methods described herein may be applicable to other types of cabinets or appliances, including other forms of refrigerators, such as, but not limited to, built in refrigerators, refrigerators having top and bottom doors, or any other cabinet configuration contemplated by a skilled artisan.

As will be described in more detail below, in at least one embodiment, an alignment gauge 10 may be used to install and align doors 56 on refrigerator 50. FIGS. 2-5 depict an alignment gauge 10 having a main body 12, that is configured to be positioned on a surface of refrigerator 50, and an alignment member 14 extending outwardly from the main body 12. In operation, the alignment member 14 may serve to establish alignment and spacing for doors 56 with respect to the cabinet 52 of refrigerator 50.

FIGS. 2-5 depict an alignment gauge 10 according to an embodiment described herein. Specifically, alignment gauge 10 may include a u-shaped main body 12, an alignment member 14 extending from the main body 12, and a boss 24 on an underside 22 of the main body 12.

Referring to FIGS. 2-5, in at least one embodiment, main body 12 includes a top portion 20, a front downward extending portion 16, and a rear downward extending portion 18, each having a width 15. Main body 12 may have an outer surface 26 opposite an underside surface 22 associated therewith. Each of front downward extending portion 16, rear downward extending portion 18, and top portion 20 may be configured as a flat element having a flat face associated with outer surface 26 and underside surface 22. Specifically, front downward extending portion 16 may be associated with front outer face 28 and front underside face 30, top portion may be associated with top outer face 32 and top underside face 34, and rear downward extending portion may be associated with rear outer face 36 and rear underside face 38. The flat front underside face 30, top underside face 34 and rear underside face 38 may facilitate stability of alignment gauge 10 when positioned on cabinet 52. In addition, having a width 15 that is a similar dimension as length 17 of front downward extending portion 16 (FIG. 5) may increase the stability of alignment gauge 10 when positioned on cabinet 52, and prevent its movement in use. However, it is also contemplated that portions of main body 12 may be alternatively sized, shaped or textured, such as curved, ribbed, or otherwise configured to appropriately interact with a surface of cabinet 52 in a stable manner.

In use, main body 12 may be configured to couple with a portion of a cabinet such as refrigerator cabinet 52 shown in FIGS. 6-9. Accordingly, portions of main body 12 may be asymmetrically sized to better interact with one or more portions of the cabinet. For example, front downward extending portion 16, rear downward extending portion 18 and top portion 20 may have various lengths depending on placement with respect to cabinet 52.

Figure 5:
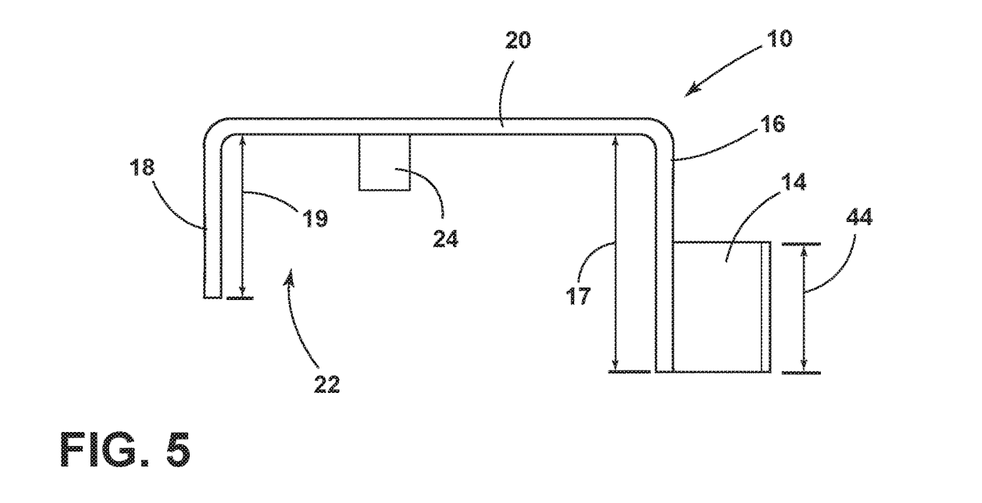
FIG. 5 is a side elevation view of the alignment gauge according to the embodiment of the present disclosure.

In at least one case main body 12 is configured to couple with a rectangular portion of a cabinet frame, such as eyebrow assembly 54 associated with cabinet 52. Referring to FIG. 5, front downward extending portion 16 has a length 17 and rear downward extending portion 18 has a length 19. Length 17 may be longer than length 17 to enable front downward extending portion 16 to extend or overhang a front surface 62 of cabinet 52 while enabling main body 12 to fit snugly against eyebrow assembly 54, as described in more detail below. In at least one embodiment, length 19 of rear downward extending portion 18 is longer than ½ the length 17 of front downward extending portion 16, facilitating placement on cabinet 52. In other cases, however, the alignment gauge may have another shape, such as a flat shape, a c-shape, a t-shape, or other shape contemplated by a skilled artisan and configured to mate with a portion of a refrigerator cabinet or otherwise couple thereto.

Alignment gauge 10 may include provisions to assist with the spacing or alignment of doors with respect to a cabinet, such as cabinet 52 of refrigerator 50. Specifically, alignment gauge 10 may define a surface that abuts or interacts with one or more doors, such as doors 56 associated with refrigerator 50, to help with positioning thereon. In some cases, an alignment member may extend from main body 12 of alignment gauge 10 and may be dimensioned to coincide with a design-specified installation gap between a pair of doors, or another design-specified spacing or element associated with the cabinet. In at least one case alignment gauge 10 includes a rectangular alignment member 14 projecting outwardly from front downward extending portion 16 of main body 12 to establish spacing or alignment.

Figure 4:
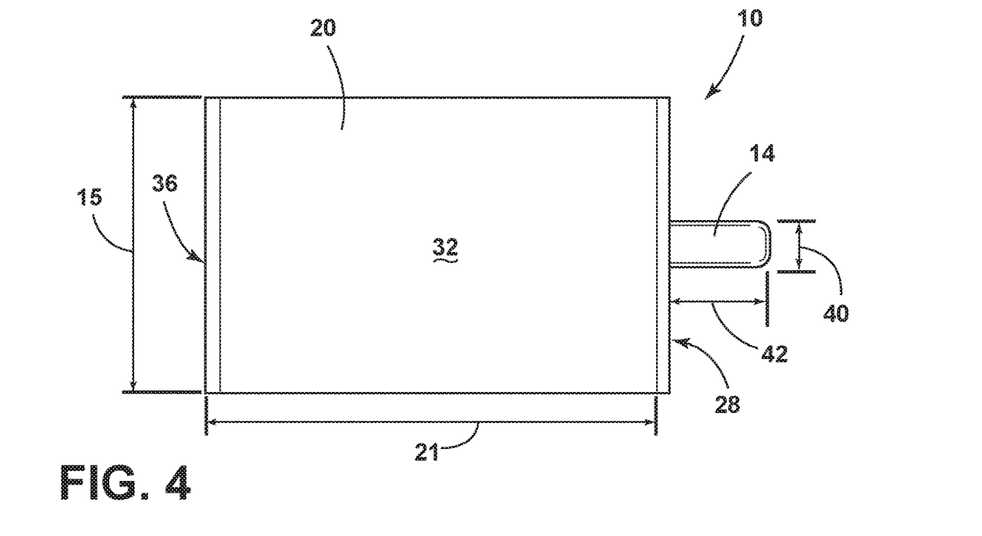
FIG. 4 is a top plan view of the alignment gauge of the embodiment according to the present disclosure.

As shown in FIGS. 2-5, according to aspects described herein, alignment member 14 may extend perpendicularly with respect to front outer face 28. Referring to FIGS. 4 and 5, alignment member 14 includes a width 40, a length 42 and a height 44. In some embodiments, width 40, length 42, and height 44 may be dimensioned to coincide with a design-specified spacing associated with cabinet 52. For example, in one case, width 40 is dimensioned the same as a design-specified gap 64 (see FIG. 9) between doors 56 of refrigerator 50 such that alignment member 14 may be used to ensure proper spacing and alignment when doors 56 are installed on refrigerator 50. In other words, a width 40 of alignment member 14 may be substantially the same as a gap width 64 between doors 56. In other cases, other aspects of alignment member 14 may be used for aligning components with respect to a cabinet, or width 40 may coincide with another design-specified spacing associated with a cabinet. For example, an alignment member as disclosed herein could also be used to establish a proper spacing between a door and the front surface of a cabinet, as opposed to establishing a spacing between a pair of doors.

Figure 6:
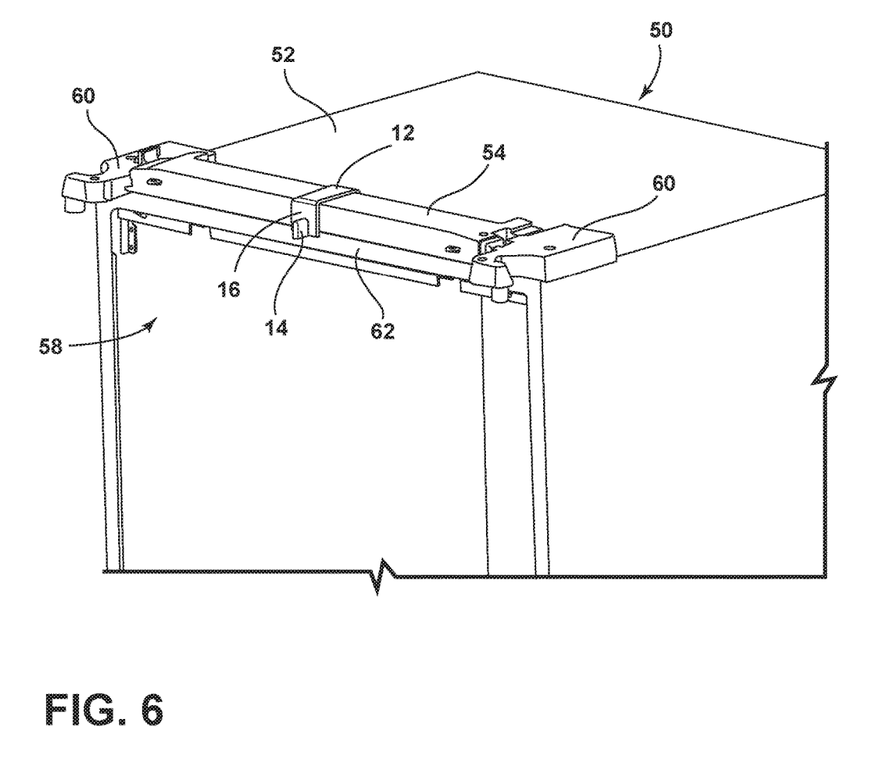
FIG. 6 is a perspective view of the alignment gauge positioned on a refrigerator according to an embodiment of the present disclosure.

In at least one case, alignment member 14 may have a height 44 that is approximately ½ of the length 17 of front downward extending portion 16. As shown in FIGS. 5 and 6, a longer downward extending portion 16 and a sufficient height 44 of alignment member 14 ensures that alignment gauge 10 may be properly spaced between doors 56. In other embodiments, however, the dimensions of portions of the alignment gauge may be altered to align with cabinets having alternate configurations or dimensions.

According to aspects set forth herein, alignment gauge 10 may also include a coupling member that is configured to be received or to couple with a portion of a cabinet frame. In at least one embodiment alignment gauge 10 may include a boss 24 that is configured to be received in a corresponding aperture, such as aperture 55 associated with eyebrow assembly 54 of refrigerator 50. Boss 24 may be configured as would be contemplated by a skilled artisan, and in at least one case may be configured as a cylindrical projection extending from top underside face 34 of main body 12. It is contemplated, however, that other types and locations of positioning elements may be included with an alignment gauge 10, and a skilled artisan would not be limited by the specific embodiments disclosed herein.

Alignment gauge 10 may be constructed from any of a wide variety of materials that provide sufficient strength or durability, in any of a wide variety of colors, textures, and combinations. For example, alignment gauge 10 may be constructed of a metal material, a polymer such as a plastic material, a rubber material, or any other rigid or semi-rigid material configured to hold shape. Thus, it will be understood by one having ordinary skill in the art that construction of the components described herein is not limited to a specific material.

As discussed above, alignment gauge 10 may be used to establish a spacing during installation or reinstallation of one or more doors or other components on a cabinet. In at least one case alignment gauge 10 may be used to install a pair of doors 56 on a French-door style refrigerator 50, as illustrated in FIG. 6-9.

Figure 7:
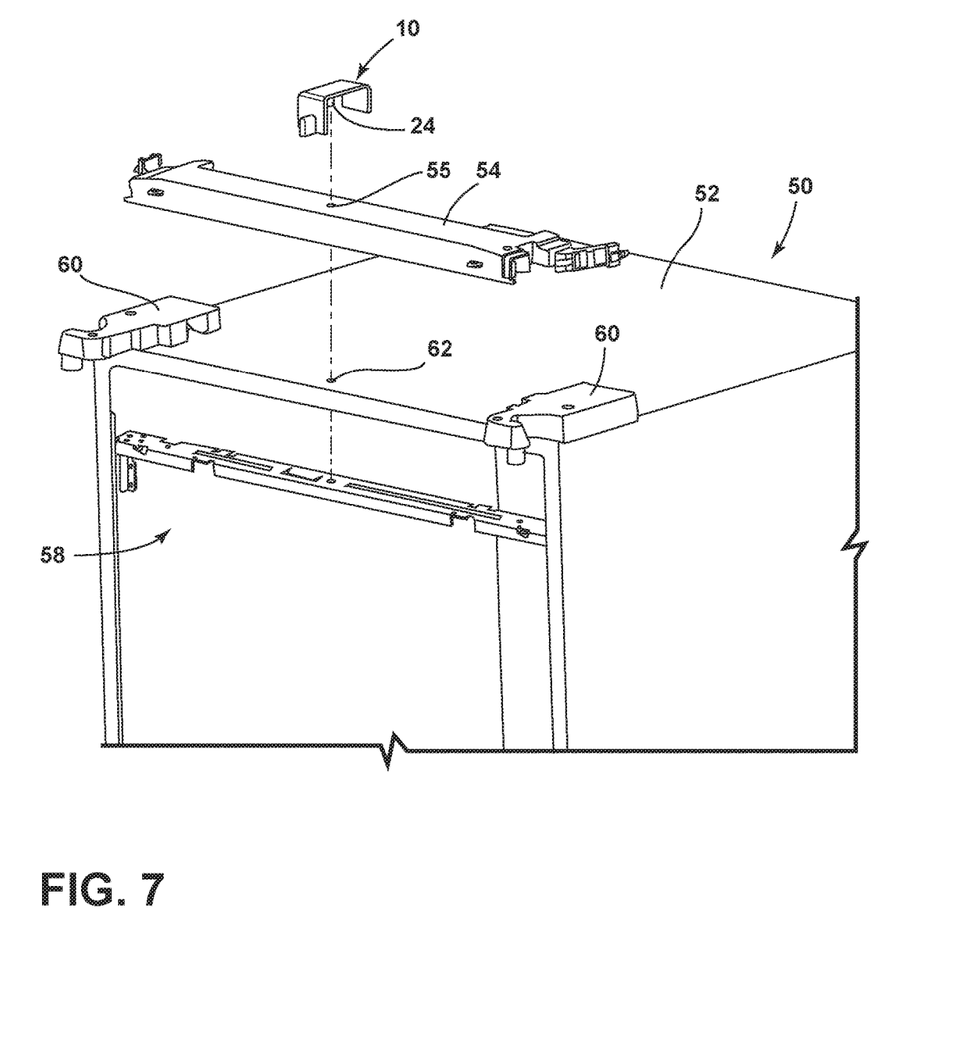
FIG. 7 is an exploded view of the alignment gauge with the refrigerator according to an embodiment of the present disclosure.

FIG. 6 depicts how alignment gauge 10 may couple with refrigerator cabinet 52, and eyebrow assembly 54, according to one embodiment. FIG. 7 depicts an exploded view of the coupling in FIG. 6, and indicates where boss 24 of alignment gauge 10 may be received in a placement aperture 55 of eyebrow assembly.

Figure 8:
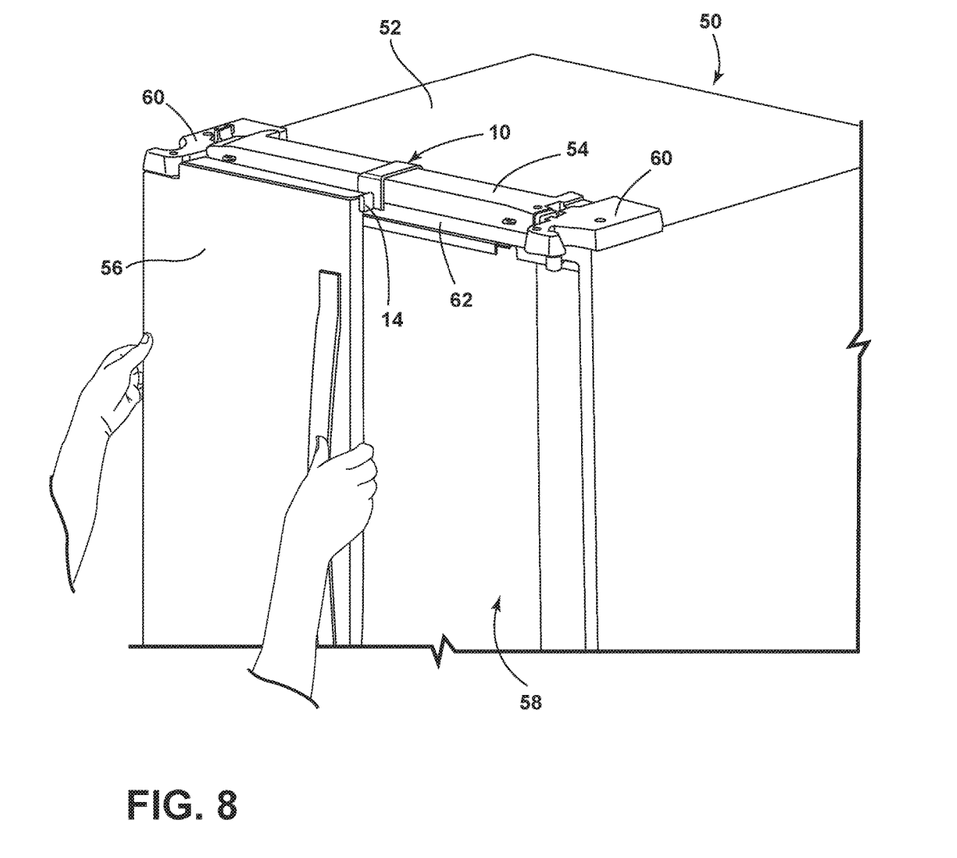
FIG. 8 is a perspective view of a door being positioned on the refrigerator with the alignment gauge according to an embodiment of the present disclosure.

In operation, referring to FIG. 6-7, a user may position alignment gauge 10 on refrigerator cabinet 52 during installation of one or more components to cabinet 52. Specifically, a user may place the u-shaped main body 12 of alignment gauge 10 over eyebrow assembly 54 such that boss 24 is received in aperture 55 and front downward extending portion 16 of main body 12 extends downward over, or overhangs, a front surface 62 of cabinet 52. When positioned, alignment member 14 protrudes outwardly along front surface 62 of cabinet 52. Referring to FIG. 8, doors 56 may then be positioned for connection to hinges 60 for installation.

Figure 9:
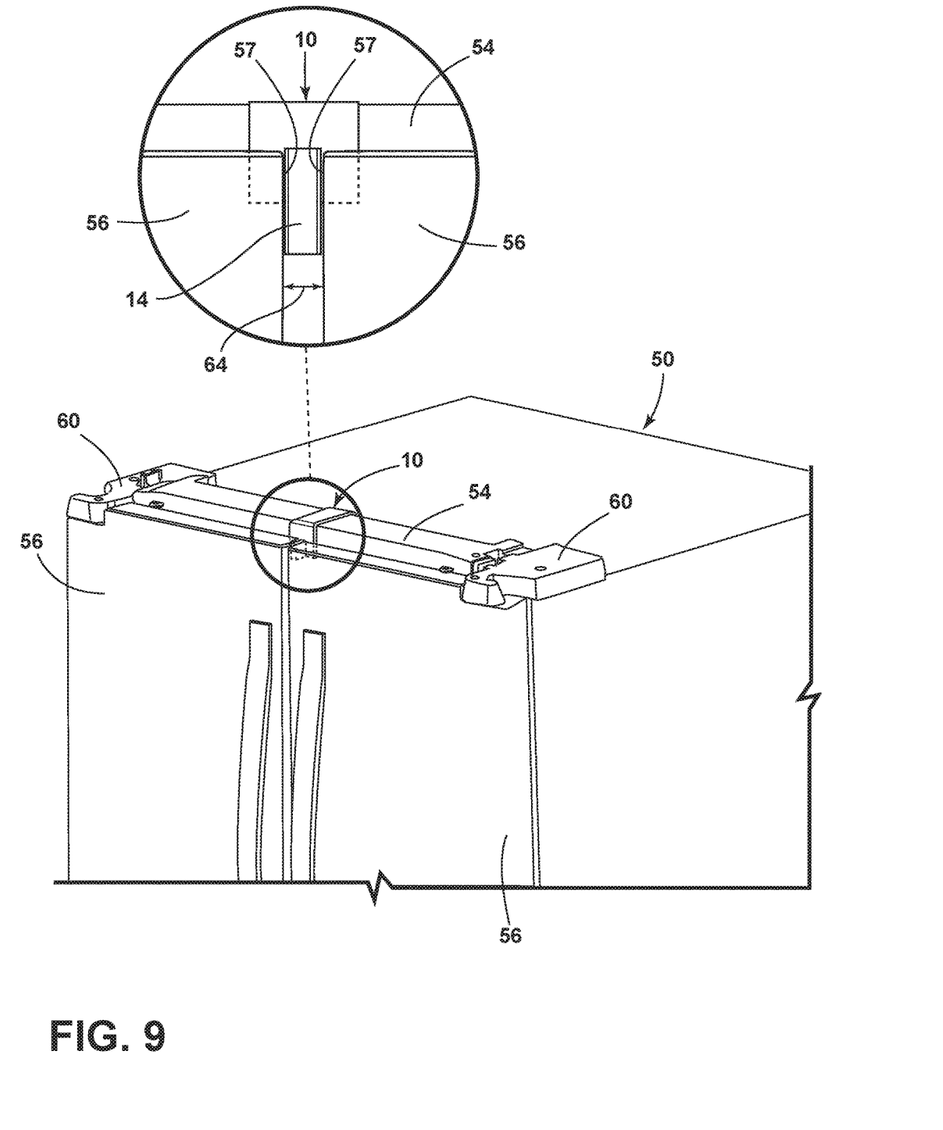
FIG. 9 is a perspective view of the alignment gauge positioned on the refrigerator according to an embodiment of the present disclosure.

After doors 56 are positioned, doors 56 may be aligned with alignment member 14 as shown in FIG. 9. More particularly, an inner edge 57 of each door 56 may align and abut with alignment member 14. In such a case, the alignment member width 40 coincides with a gap width 54 between doors 56. Accordingly, when held in position against alignment member 14, a proper spacing and alignment may be established and doors 56 may be tightened to hinges 60 or otherwise fixedly attached to cabinet 52.

It is important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the spirit and scope of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An alignment gauge for a refrigerator, the alignment gauge comprising:
    a main body having a first downward extending portion and a second downward extending portion, wherein the main body is configured to be positioned on a cabinet of the refrigerator;
    an alignment member extending outwardly from the first downward extending portion, wherein a dimension of the alignment member is the same as a spacing between a pair of doors associated with the refrigerator, wherein a boss extends from an underside of the main body between the first downward extending portion and the second downward extending portion and the cabinet of the refrigerator includes an aperture that is configured to receive the boss.

2. The alignment gauge of claim 1, wherein:
    the main body is u-shaped.

3. The alignment gauge of claim 1, wherein:
    the second downward extending portion is configured to abut the cabinet when in use; and
    the first downward extending portion overhangs a front surface of the cabinet.

4. The alignment gauge of claim 1, wherein:
    the first downward extending portion includes a flat face; and
    the alignment member extends perpendicularly outwardly from the flat face.

5. The alignment gauge of claim 1, wherein
    a surface of each door of the pair of doors abuts at least a portion of the alignment member when coupled to the cabinet.

6. The alignment gauge of claim 1, wherein:
    the alignment member is configured to extend between the pair of doors when in use to establish the spacing between the pair of doors.

7. The alignment gauge of claim 1, wherein:
    the cabinet of the refrigerator includes an eyebrow assembly, and wherein,
        the first downward extending portion and the second downward extending portion are configured to be positioned over the eyebrow assembly.

8. An alignment gauge comprising:
    a u-shaped main body that is configured to be positioned on a cabinet;
    an alignment member extending outwardly from the main body, wherein the alignment member is configured to establish a spacing for at least one component attached to the cabinet, and wherein the u-shaped main body comprises:
    a first downward extending portion; and
    a second downward extending portion, wherein the first downward extending portion is longer than the second downward extending portion.

9. The alignment gauge of claim 8, wherein:
the alignment member is configured to establish a spacing for at least one door attached to the cabinet.

10. The alignment gauge of claim 8, wherein:
the alignment member extends outwardly from a face of the first downward extending portion.

11. The alignment gauge of claim 8, wherein:
the alignment member is configured to establish a spacing for a pair of doors attached to the cabinet.

12. The alignment gauge of claim 11, wherein:
the spacing for the pair of doors comprises a gap width between the doors, and
a dimension of the alignment member is substantially the same as the gap width.

13. The alignment gauge of claim 8, wherein:
the u-shaped main body is configured to be positioned on an upper surface of the cabinet.

14. The alignment gauge of claim 8, wherein:
a boss extends from an underside of the u-shaped main body; and
the cabinet includes an aperture that is configured to receive the boss.

15. A method of aligning a door on a refrigerator cabinet, the method comprising:
positioning an alignment gauge on the refrigerator cabinet;
positioning the door on the refrigerator cabinet so that a surface of the door abuts a surface of the alignment gauge;
coupling the door to the refrigerator cabinet; and
positioning a surface of the door against an alignment member, wherein the alignment gauge comprises a u-shaped main body and an alignment member extending from the main body.

16. The method of claim 15, further comprising:
fixedly attaching the door to a hinge on the cabinet.

17. The method of claim 15, further comprising:
using a positioning element to position the alignment gauge on the refrigerator cabinet.

* * * * *